Oct. 30, 1945.　　　　　E. S. PEARCE　　　　2,387,806
JOURNAL BEARING
Filed June 2, 1942

INVENTOR
Edwin S. Pearce
BY
ATTORNEYS

Oct. 30, 1945.  E. S. PEARCE  2,387,806
JOURNAL BEARING
Filed June 2, 1942  4 Sheets-Sheet 2
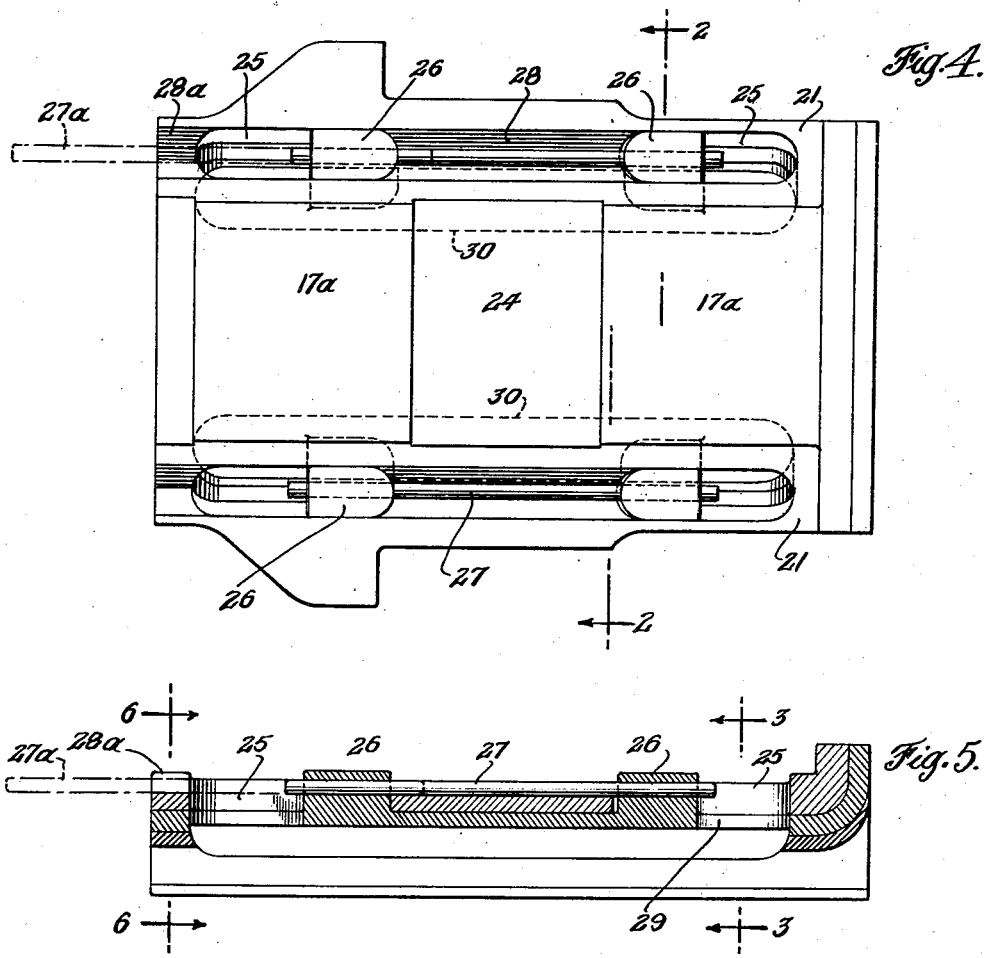
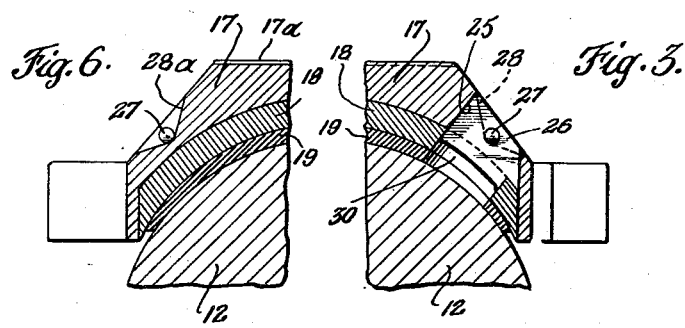
INVENTOR
Edwin S. Pearce
BY
ATTORNEYS Oct. 30, 1945.  E. S. PEARCE  2,387,806
JOURNAL BEARING
Filed June 2, 1942   4 Sheets-Sheet 4

INVENTOR
Edwin S. Pearce
BY
Synnestvedt & Lechner
ATTORNEYS

Patented Oct. 30, 1945

2,387,806

UNITED STATES PATENT OFFICE 2,387,806

JOURNAL BEARING

Edwin S. Pearce, Indianapolis, Ind.

Application June 2, 1942, Serial No. 445,418

8 Claims. (Cl. 308—54)

This invention relates to journal bearings and particularly to crown journal bearings for use in the axle boxes of railway vehicles.

The objects of the invention include the following: To provide a structure by means of which it is possible to greatly reduce the quantities of strategic metals such as copper, lead, tin and antimony which have heretofore gone into the manufacture of bearings of the type in question; to improve the strength of the bearing and its ability to withstand the stress and wear of service as well as to increase its resistance to the destructive effects of heat; to provide a structure which combines the best characteristics of ferrous as well as of non-ferrous metals; to provide a bearing which has an increased margin of operating safety; to provide a bearing which may be relatively cheaply manufactured, easily replaced or renewed as well as one which is interchangeable with prevailing structures; to provide (in a bearing of the character described) a structural backing or strength member which is capable of functioning as an adapter for use with separable or readily renewable or replaceable bearing metal parts or inserts whereby any one of several types of operational characteristics can be employed as may best meet the demands of any particular service; to provide (in connection with the object last recited) a structure in which the bearing part or insert is kept in its proper place by means which lie outside the major load supporting area of the bearing whereby certain difficulties heretofore encountered in composite bearings are entirely overcome; to provide a structure having an adapter or backing member and a bearing metal insert as described in which the insert is not positively interlocked with the adapter or backing member so as to become, in effect, an integral part thereof as has been characteristic of composite bearings heretofore used in the art, but rather one wherein the bearing insert is held in place by means which permit ready separation of the two parts so that the insert can be detached and renewed at the point or place of application without the necessity of sending the bearing assembly to the shop; to provide a bearing having an adapter or backing member and a bearing metal insert, as described, wherein the insert is not subject to any distortion which might otherwise occur due to the relative difference in the coefficient of expansion between the material of the backing member and the material of the insert; to provide a bearing having a backing or adapter member into which inserts of different types can be fitted so as to yield certain changes in oil circulation characteristics, and this by means of a simple casting operation without the necessity of extensive and expensive machine work; and, in general, to materially improve the operational characteristics of railway axle crown journal bearings, while at the same time cheapening their cost, increasing their strength and simplifying their maintenance.

Other objects and advantages will occur to those skilled in this art as the description proceeds, reference now being had to the accompanying drawings, wherein—

Figure 3 is a partial section taken on the line 3—3 of Figure 5;

Figure 4 is a plan view of my improved bearing;

Figure 5 is a section taken on the line 5—5 of Figure 2;

Figure 6 is a section on the line 6—6 of Figure 5;

Figure 1:
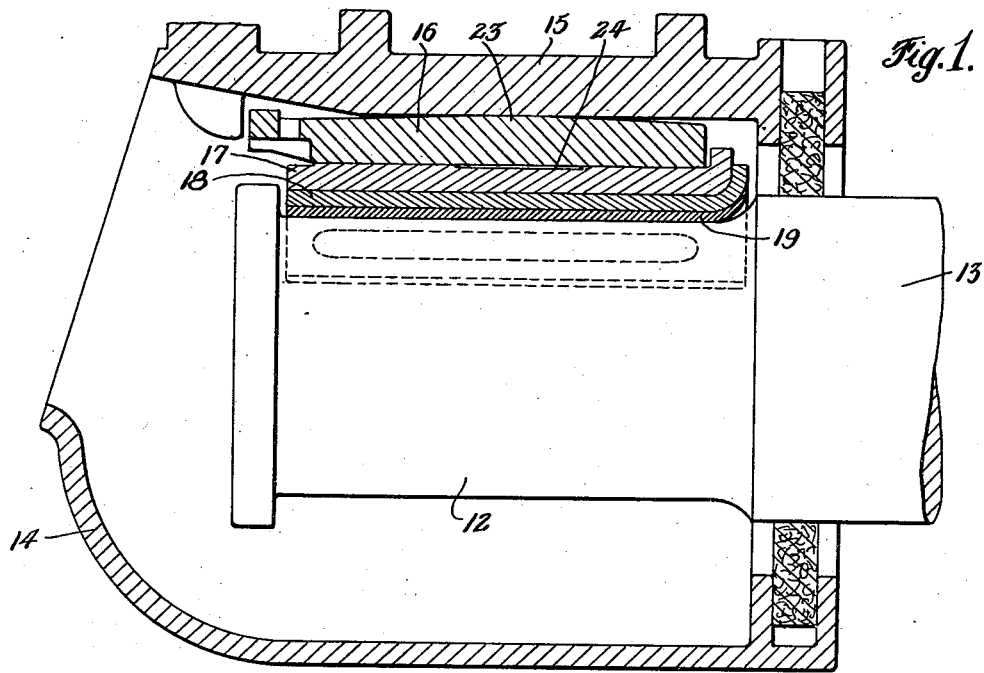
Figure 1 is a vertical longitudinal section through a journal box of a railway vehicle showing my improved bearing structure applied therein, the section being taken approximately as indicated by the line 1—1 in Figure 2.
Figure 2:
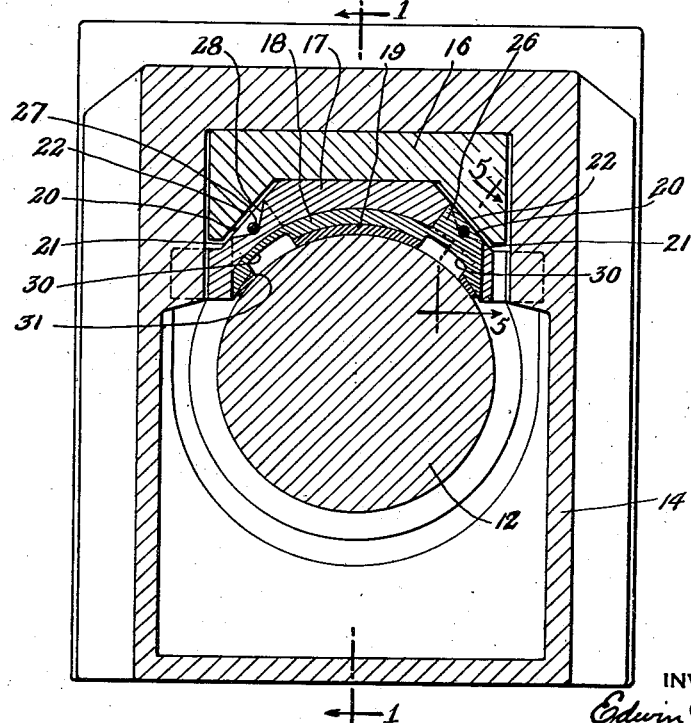
Figure 2 is a vertical transverse section through a journal box equipped with my invention, the section being taken approximately as indicated by the line 2—2 of Figure 4.

In Figures 1 and 2 of the drawings the usual journal 12 on the end of the car axle 13 is shown as projecting into the car or journal box 14 in a manner well understood in this art. Immediately beneath the top of the box 15 is the customary so-called wedge member 16 between which and the journal 12 is located the improved crown journal bearing of the present invention.

The bearing comprises a structural backing or strength member 17, a separable bearing metal insert 18 and a Babbitt metal lining 19. The strength or backing member constitutes an adapter as will more fully appear hereinafter, and is preferably composed of steel or other metal or alloy having relatively great strength and high melting point. The general shape of this backing or adapter member and the configuration of its top surface or back is, preferably, substantially the same as that of the ordinary bearing familiar in this art, and it will be seen that it cooperates with the wedge 16 so as to provide a slight space 20 at each side between the inclined surface 21 of the bearing and the adjacent inclined surface 22 of the wedge. This space, while not a part of the present invention is referred to specifically because of its relation to one of the features of the present invention, as will appear hereinafter.

The load is transmitted through the top of the box to the central high point 23 of the wedge and distributed by the latter to the longitudinally spaced end portions 17a on the back of the adapter, thus leaving a central relieved area 24 the nature and purpose of which is more fully described and claimed in my prior Patent 2,154,916, issued April 18, 1939. The inclined faces 21 of the adapter 17 are each provided with a pair of elongated longitudinally spaced openings 25 which are formed as apertures or holes extending all the way through from the journal face of the adapter out to the space 20.

The bearing insert 18 is preferably composed of some suitable relatively soft bearing metal, such as bronze, on each side of the back of which are provided the complementary positioning lugs 26 arranged in pairs at each side so as to project substantially radially outwardly into corresponding openings 25 in the adapter or backing member, as shown to best advantage in Figure 4.

As shown, the openings 25 and the lugs 26 are arranged in pairs at each side of the crest of the bearing so that they are well removed from the region of highest bearing load and are not subject to the stresses which are ordinarily set up in and near the crest of the bearing.

The two parts just described may be held together when assembled by means of a pair of dowel pins 27 which are introduced from one end of the bearing into suitable longitudinally extending apertures in the lugs 26, as shown to best advantage in Figures 4 and 5 in which figures the partially inserted dowels are shown in dot-and-dash lines 27a in order to bring out this feature somewhat more clearly. When in assembled position the mid portion of the dowels 27 overlies the V-shaped portions 28 on the back or top surface of the sides of the adapter. During insertion the dowels 27 pass over similar inclined or V-shaped surfaces 28a at the outer end of the bearing. This arrangement for holding the two parts together is not essential to a realization of the advantages of the invention because, in service, my improved bearing functions as a unit without the dowels. However, the dowels serve to keep the parts 17 and 18 together as companionate parts when they are initially assembled and shipped.

Figure 7:
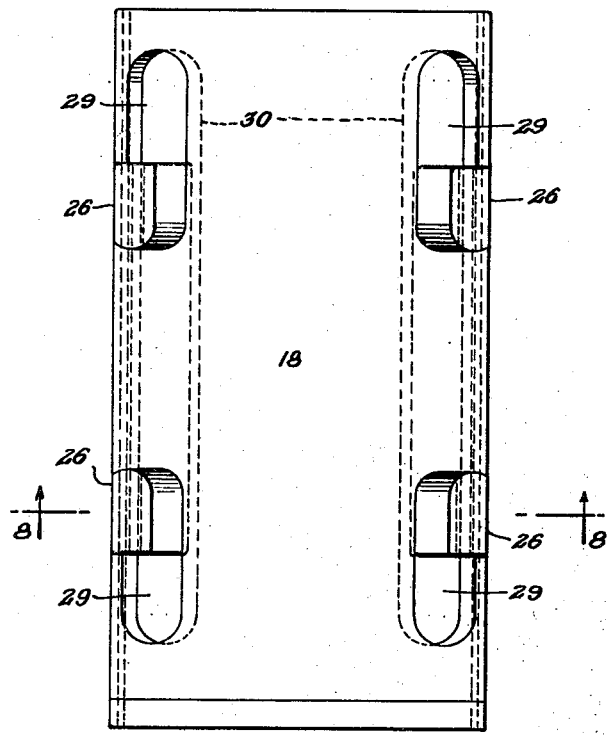
Figure 7 is a plan view of one type of bearing metal insert which can be utilized with my improved backing or adapter member.
Figure 8:
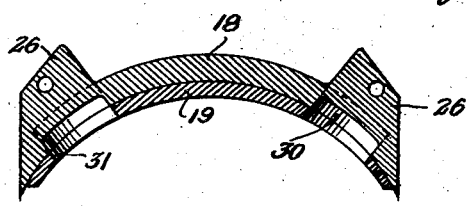
Figure 8 is a section on the line 8—8 of Figure 7.

The type of bearing metal insert shown in Figures 1 to 6 inclusive is illustrated in greater detail in Figures 7 and 8, and it will be seen that endwise of each lug 26, i. e., beyond the lug toward the end of the bearing, there is an aperture 29 which registers with the adjacent or corresponding opening 25 in the backing or adapter member.

The journal face of the insert 18 is provided at each side of its crest with an elongated slot 30 which extends throughout substantially the entire length of the bearing although the slots are closed at their ends. These slots are of substantial width, as shown, and are arranged in alignment with the openings 25 and the holes or openings 29. It will also be noted that the width of the holes 25 and 29 is substantially the same as the width of the slots and that the slots in cooperation with the holes provide oil circulating passages which extend entirely through the bearing from its journal face to the inclined surfaces 21 on the back so that oil which is carried upwardly on the surface of the journal 12 can accumulate in the slots and flow upwardly and outwardly through the holes 25 and 29 for discharge into the space 20 from which it can fall back again to the bottom of the box.

The journal face of the insert is preferably provided with the customary Babbitt metal lining 19 as already mentioned, there being openings 31, of course, in this lining to register with the slots 30.

It should be noted that the slots 30, in cooperation with the openings 31, constitute elongated slots which are of substantial depth as well as width. This is important to the proper functioning of the slots throughout the life of the bearing. The oil coming up on the surface of the journal fills the slot on the inbound side so that it acts as a lubricant reservoir. Indeed, it is important to have the slots 30 in the member 18 of substantial depth regardless of the possible thickness of the lining 19, so that the slots as a whole can function satisfactorily even after the lining becomes very much worn in service so that its thickness is materially reduced. The importance of this is emphasized by the fact that it is desirable to keep the lining 19 as thin as possible not only to save lead and tin but also to promote heat conductivity. Lead is a relatively poor conductor of heat so that the conductivity of the bearing as a whole is improved by reducing the thickness of the lining 19 and, therefore, the amount of lead through which the heat must travel. By making the slot 30 in the bearing metal insert 18 of considerable depth as shown and described, it is possible to preserve the functions of the slot throughout the life of the bearing while at the same time effecting a substantial saving in strategic metals.

At this point I should also like to call attention to the fact that by aligning the lugs 26 with the slots 30 there is very little if any surface under the lugs 26 which contacts with the surface of the journal 12. Even those portions of the bearing which lie to the outside of the slots 30, under all normal running conditions, do not actually contact with the surface of the journal due to the so-called "wedge space" which exists at each side of a crown bearing of this type. This serves to reduce to a minimum the amount of heat which is developed and transferred through the metal to the parts which cooperate in holding the adapter and the bearing metal insert in proper relationship during service.

It will be seen that my improvements make it possible to substantially reduce the amount of bearing metal or bearing metal alloy which has heretofore been employed in the manufacture of crown journal bearings. As a general rule in previous practice the entire bearing has been made of a solid piece of brass with a lining of Babbitt metal. With my invention the backing or adapter member 17 can be made of steel which is not only less expensive but also far stronger than brass and much less subject to damage from overheating and mechanical stresses. In addition, while the insert 18 is preferably made of brass, the quantity of brass required is kept at a minimum by virtue of the slots 30 and the holes 29. Again, there is still further saving in strategic and expensive metals or alloys since the Babbitt lining 19 does not extend throughout the entire journal face of the bearing but is provided with the openings 31 in registry with the openings 30 so that the weight of babbitt which would ordinarily go into the formation of a lining over the areas in question is rendered unnecessary in my improved construction.

By way of specific example as to the possibilities in the saving of metals which are now scarce and therefore of great strategic importance in the present national war emergency, I wish to insert the following comparative table which shows the relative weights in pounds of the copper, lead and tin found in a standard bearing of present design and in the improved bearing of the present application. The figures are based upon a 5½" x 10" journal bearing.

| Metal | Present standard | Present invention |
| --- | --- | --- |
| Pounds of copper | 15.51 | 3.71 |
| Pounds of lead | 8.06 | 4.52 |
| Pounds of tin | 1.22 | .38 |

In addition to the foregoing, my improved construction makes possible another important saving. In the conventional bearings known to the art which are generally of one piece, antimony is included as a hardener or an agent to increase the mechanical strength of the copper-lead-tin alloy customarily employed in the manufacture of bearings. With my invention the proper degree of strength is supplied by the ferrous metal adapter 17. It will be seen, therefore, that the bearings of the prior art actually represent a compromise between bearing qualities on the one hand and strength characteristics on the other hand, whereas, with my improved construction, the bearing metal insert 18 can be fabricated upon 100% bearing requirements and the adapter upon 100% mechanical or strength requirements. In this way I am enabled to greatly improve the operational characteristics of the bearing as well as to lengthen its useful life.

In addition to the advantage incident to the saving of metal it will also be realized that my improvements make it possible to provide a bearing construction of greatly increased strength while at the same time in no way sacrificing the advantages which are to be found in the employment of the so-called bearing metals. The strength and resistance to mechanical stresses and the damaging effects of heat are realized through the fact that the adapter can be made of steel, and the advantages incident to the use of the so-called bearing metals through the fact that the bearing insert can be made of such materials. For example, in the event that a hot box should develop and the babbitt lining 19 melt out, the bearing metal of the insert 18 would come into contact with the journal 12 instead of the steel of the adapter 17, so that damage to the journal would be avoided.

With my improvements the adapter really becomes a part of the journal box assembly in the same sense as is the usual wedge 16, and the adapter with its bearing insert can be readily substituted for the customary bearing without involving any change whatsoever in present practice. Furthermore, where replacements become necessary, all that is required is to have on hand a stock of bearing inserts which can be easily applied to my improved adapter, as described.

The oil circulating feature described yields a number of distinct advantages not the least of which is better dissipation of the heat, since the oil in circulating upwardly through the side openings 25 and 29 and then downwardly again to the waste in the bottom of the box helps materially to keep down the temperature of the bearing. Furthermore, the large capacity of the circulating slots is, in itself, an added insurance against trouble with hot boxes because the oil, in constantly circulating upwardly and outwardly through the sides of the bearing, as described, tends to wash out any dirt, grit, lint or short ends of waste before they can be carried upwardly on the surface of the journal into the region of the crest where the highest bearing loads are found.

Figure 9:
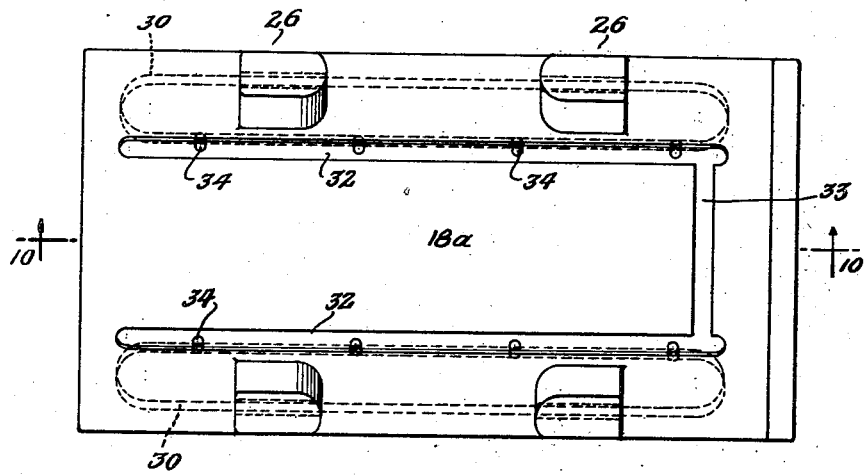
Figure 9 is a plan view of another type of bearing metal insert which can be utilized with my improved adapter or backing member.
Figure 10:
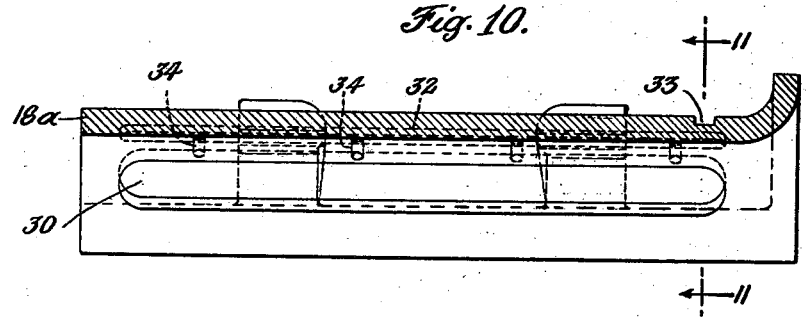
Figure 10 is a section on the line 10—10 of Figure 9.
Figure 11:
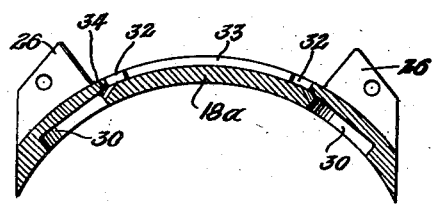
Figure 11 is a section on the line 11—11 of Figure 10.

It is sometimes desirable to circulate the oil from one side to the other of the bearing as in the manner described in my prior Patent 1,964,688, issued June 26, 1934, and my invention makes it possible to incorporate the advantageous features of that patent by simply changing the bearing insert. Instead of the insert already described and illustrated in Figures 1 to 8 inclusive, the insert illustrated in Figures 9 to 11 may be employed wherein the apertures 29 are omitted so that the slots 30 are not directly connected to the openings 25 in the adapter. In fact, by making the bearing insert 18a of Figures 9 to 11 imperforate over the area where the holes 29 were located in the insert 18 of the other figures, all criculation of the kind so far described is prevented.

Instead I provide for the circulation of Patent 1,964,688 by forming in the upper face or back of the insert 18a a pair of longitudinally extending channels or grooves 32, one at each side of the crest, which are connected by a transverse channel or groove 33 located near one end of the bearing. A series of small apertures or openings 34 are then provided which connect the upper corner portion of each slot 30 with the adjacent longitudinal channel 32 on the back of the insert. In the embodiment shown, four holes 34 are illustrated for each side of the bearing. The insert is otherwise exactly the same as the insert 18 already described, and when placed in the adapter the upper open faces of the channels 32 and 33 are effectively closed so that the oil which enters the slot 30 on the upbound side of the rotating journal can pass through the holes 34 into the corresponding longitudinal channel 32 from which it traverses the cross channel 33 into the other longitudinal channel 32, and then downwardly through holes 34 into the slot 30 on the outbound side of the journal. As described in my Patent 1,964,688, the vacuum created on the outbound side plus the tendency to build up a pressure on the inbound side causes the oil to circulate from the inbound side to the outbound side and be discharged on the latter side. This circulation helps to cool the bearing and insures an adequate supply of oil which is stored in the channels 32 and 33 when the journal begins rotation after a period of idleness. Furthermore, such circulation helps to keep both sides of the waste in the journal box equally well saturated with oil so that, after long periods of running in one direction, there is not, as would otherwise happen, a tendency to accumulate the oil in that portion of the waste which is located on the inbound side while leaving the outbound side somewhat dry.

My invention, therefore, makes it possible to employ cross circulation of the type just described in an exceedingly simple way. All that it is necessary to do is to substitute the bearing insert 18a for the bearing insert 18, and since the inserts are readily made as castings, no troublesome and expensive machining is necessary as has heretofore been customary with the invention of my Patent 1,964,688.

In conclusion, I wish to point out that my improved construction involves no permanent union between the inserts and the adapter such, for example, as might be provided by pressing, keying, riveting, or otherwise permanently securing the one part to the other with the idea of making the insert, in effect, an integral part of the backing or adapter. Composite bearings of this nature have heretofore been attempted with the idea of approaching as nearly as possible a construction which involves such a close union between the insert and the backing as to make them, in effect, one inseparable member which must be treated in exactly the same way as the standard bearings customary in the art. My improvement involves a readily detachable or separable bearing metal insert which is held in position by means located beyond the region of high bearing loads so as to be substantially unaffected by the stresses set up in and near the crest of crown journal bearings. This avoids distortion and other difficulties incident to the difference in coefficient of expansion between the backing member and the insert.

What I claim is:

1. In a railway axle journal box having a wedge with a central load transmitting area of substantial width flanked by a downwardly facing and outwardly inclined portion at each side; a bearing adapted to cooperate with the wedge in transmitting the load to the journal, said bearing comprising a structural adapter or strength member having a load receiving crest portion of a width corresponding to the width of the central load transmitting area of the wedge, a downwardly and outwardly extending inclined portion at each side of said crest, which inclined portions are arranged in slightly spaced relation to the adjacent inclined faces of the wedge so that they receive no load from the wedge, an opening in an inclined side portion of said adapter member opposite the adjacent inclined face of the wedge, a separable insert member of relatively soft bearing metal, and a cooperating positioning lug on the back of said insert member opposite to said opening in the adapter, which lug projects substantially radially outwardly into said opening to lie outside the load receiving crest portion of said adapter member.

2. The structure of claim 1 in which the opening in the adapter, longitudinally of the bearing, is of greater dimension than the lug and in which the insert is provided with a hole aligned with the opening in the adapter.

3. In a railway axle journal box having a wedge with a central load transmitting area of substantial width flanked by a downwardly facing and outwardly inclined portion at each side; a bearing adapted to cooperate with the wedge in transmitting the load to the journal, said bearing comprising a structural adapter or strength member having a load receiving crest portion of a width corresponding to the width of the central load transmitting area of the wedge, a downwardly and outwardly extending inclined portion at each side of said crest, which inclined portions are arranged in slightly spaced relation to the adjacent inclined faces of the wedge so that they receive no load from the wedge, a separable insert member of relatively soft bearing metal, an opening in a side of one of said members, which opening is located in the region opposite the adjacent inclined face of the wedge, and a cooperating positioning lug on the adjacent face of the other member, which lug projects substantially radially outwardly into said opening to lie outside the load receiving crest portion of said adapter member.

4. The structure of claim 3 in which said opening, longitudinally of the bearing, is of greater dimension than the lug, and in which a hole is provided in the member having the lug, which hole is located in alignment with the opening in the other member.

5. In a crown journal bearing of the type which is used in railway vehicle axle boxes, the combination of a structural adapter or strength member having a crest portion which is adapted to receive load from the vehicle on its upper face, a downwardly and outwardly extending inclined portion at each side of said crest, which inclined portions receive no load from the vehicle on their upper faces, an opening in each of said inclined side portions, a separable insert of relatively soft bearing metal, a cooperating lug on the back of each side portion of the insert projecting radially outwardly into the opening in the adjacent side portion of the adapter to lie outside the load receiving crest portion thereof, and a slot in the journal face of the insert at each side of the crest, said slots being arranged in radial alignment with the corresponding opening and lug.

6. The structure of claim 5 in which the openings in the adapter side portions, longitudinally of the bearing, are of greater dimension than the lugs and in which each side of the insert is provided with a hole in alignment with the slot and the adjacent adapter opening, whereby to form an oil circulating passage extending entirely through each side of the bearing.

7. In a railway vehicle crown journal bearing of the type which is used with a superposed wedge, the combination of a structural adapter or strength member having a wedge contacting, load-receiving crown surface on its upper face, a downwardly and outwardly extending inclined portion at each side of said load-receiving crown surface which side portions are adapted to clear the wedge so as to receive no load therefrom on their upper faces, a pair of longitudinally spaced elongated openings through each of said inclined side portions, a separable insert of relatively soft bearing metal, a pair of cooperating lugs on the back of each side of said insert positioned to extend into the corresponding openings in the inclined side portions of the adapter, said adapter openings being of greater longitudinal dimension than the lugs of the insert, a slot in the journal face of the insert at each side of the crest, and a hole through the insert adjacent each of said lugs, the opening in the adapted and the holes in the insert being arranged in alignment with the corresponding slot in the face of the insert whereby to form an oil circulating passage extending entirely through the bearing.

8. In a crown journal bearing of the type which is used in railway vehicle axle boxes, the combination of a structural adapter or strength member having a crest portion which is adapted to receive load from the vehicle on its upper face, a downwardly and outwardly extending inclined portion at each side of said crest, which inclined portions receive no load from the vehicle on their upper faces, an opening in each of said inclined side portions, a separable insert of relatively soft bearing metal, a cooperating lug on the back of each side portion of the insert projecting radially outwardly into the opening in the adjacent side portion of the adapter to lie outside the load receiving crest portion thereof, a slot in the journal face of the insert at each side of the crest, said slots being arranged in radial alignment with the corresponding opening and lug, oil circulating passage means at the back of the insert at each side thereof, and a connecting aperture extending from each slot through the insert to said passage means.

EDWIN S. PEARCE.